United States Patent
Ackermann et al.

(10) Patent No.: US 10,094,241 B2
(45) Date of Patent: Oct. 9, 2018

(54) NON-CONTACT SEAL ASSEMBLY FOR ROTATIONAL EQUIPMENT

(71) Applicant: United Technologies Corporation, Hartford, CT (US)

(72) Inventors: William K. Ackermann, East Hartford, CT (US); Clifton J. Crawley, Jr., Glastonbury, CT (US); Frederick M. Schwartz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 481 days.

(21) Appl. No.: 14/830,514

(22) Filed: Aug. 19, 2015

(65) Prior Publication Data

US 2017/0051631 A1 Feb. 23, 2017

(51) Int. Cl.
| | |
|---|---|
| F01D 25/12 | (2006.01) |
| F01D 5/08 | (2006.01) |
| F01D 5/30 | (2006.01) |
| F01D 11/00 | (2006.01) |
| F16J 15/44 | (2006.01) |
| F01D 5/02 | (2006.01) |
| F01D 9/04 | (2006.01) |

(Continued)

(52) U.S. Cl.
CPC ............ *F01D 25/12* (2013.01); *F01D 5/02* (2013.01); *F01D 5/082* (2013.01); *F01D 5/3015* (2013.01); *F01D 9/041* (2013.01); *F01D 11/001* (2013.01); *F01D 11/04* (2013.01); *F01D 11/08* (2013.01); *F02C 3/14* (2013.01); *F02C 7/18* (2013.01); *F16J 15/442* (2013.01); *F05D 2220/323* (2013.01); *F05D 2240/35* (2013.01); *F05D 2240/55* (2013.01); *Y02T 50/671* (2013.01); *Y02T 50/673* (2013.01); *Y02T 50/676* (2013.01)

(58) Field of Classification Search
CPC .......... F01D 5/02; F01D 5/082; F01D 5/3015; F01D 11/001; F01D 11/02; F01D 11/08; F01D 25/12; F02C 3/14; F02C 7/16; F02C 7/18; F16J 15/442
USPC ....................................... 415/173.7
See application file for complete search history.

(56) References Cited

U.S. PATENT DOCUMENTS

| | | | |
|---|---|---|---|
| 2,988,325 A | | 6/1961 | Grahame et al. |
| 4,425,079 A | * | 1/1984 | Speak .................... F01D 5/081 415/115 |

(Continued)

FOREIGN PATENT DOCUMENTS

| | | |
|---|---|---|
| EP | 1269048 | 1/2003 |
| EP | 1654484 | 5/2005 |

(Continued)

OTHER PUBLICATIONS

EP search report for EP16185010.2 dated Nov. 3, 2016.

*Primary Examiner* — Timothy L Maust
(74) *Attorney, Agent, or Firm* — O'Shea Getz P.C.

(57) ABSTRACT

Assemblies are provided for rotational equipment. One of these assemblies includes a bladed rotor assembly, a stator vane assembly, a fixed stator structure and a seal assembly. The bladed rotor assembly includes a rotor disk structure. The stator vane assembly is disposed adjacent the bladed rotor assembly. The fixed stator structure is connected to and radially within the stator vane assembly. The seal assembly is configured for sealing a gap between the stator structure and the rotor disk structure, wherein the seal assembly includes a non-contact seal.

18 Claims, 7 Drawing Sheets

(51) Int. Cl.
  *F01D 11/04* (2006.01)
  *F01D 11/08* (2006.01)
  *F02C 3/14* (2006.01)
  *F02C 7/18* (2006.01)

(56) References Cited

U.S. PATENT DOCUMENTS

| | | | | |
|---|---|---|---|---|
| 4,466,239 A * | 8/1984 | Napoli | ............... | F01D 5/082 |
| | | | | 415/116 |
| 5,402,636 A * | 4/1995 | Mize | ............... | F01D 3/00 |
| | | | | 415/115 |
| 5,503,528 A * | 4/1996 | Glezer | ............... | F01D 11/001 |
| | | | | 415/115 |
| 6,428,009 B2 | 8/2002 | Justak | | |
| 7,182,345 B2 | 2/2007 | Justak | | |
| 7,410,173 B2 | 8/2008 | Justak | | |
| 7,445,424 B1 * | 11/2008 | Ebert | ............... | F01D 5/081 |
| | | | | 415/113 |
| 7,797,941 B2 * | 9/2010 | Munsell | ............... | F01D 11/04 |
| | | | | 60/726 |
| 7,896,352 B2 | 3/2011 | Justak | | |
| 7,927,069 B2 * | 4/2011 | Erickson | ............... | F01D 5/3015 |
| | | | | 415/173.7 |
| 8,002,285 B2 | 8/2011 | Justak | | |
| 8,105,021 B2 | 1/2012 | Glahn | | |
| 8,109,716 B2 | 2/2012 | Glahn | | |
| 8,109,717 B2 * | 2/2012 | Glahn | ............... | F02C 7/28 |
| | | | | 415/174.2 |
| 8,167,545 B2 * | 5/2012 | Glahn | ............... | F01D 11/001 |
| | | | | 415/171.1 |
| 8,172,232 B2 * | 5/2012 | Justak | ............... | F16J 15/442 |
| | | | | 277/411 |
| 2002/0000694 A1 | 1/2002 | Justak | | |
| 2004/0150164 A1 * | 8/2004 | Morgan | ............... | F01D 11/001 |
| | | | | 277/345 |
| 2004/0217549 A1 | 11/2004 | Justak | | |
| 2004/0247429 A1 * | 12/2004 | Arilla | ............... | F01D 5/081 |
| | | | | 415/116 |
| 2006/0222486 A1 * | 10/2006 | Maguire | ............... | F01D 5/081 |
| | | | | 415/116 |
| 2007/0018409 A1 | 1/2007 | Justak | | |
| 2007/0096397 A1 | 5/2007 | Justak | | |
| 2007/0120327 A1 | 5/2007 | Justak | | |
| 2008/0100000 A1 | 5/2008 | Justak | | |
| 2008/0246223 A1 | 10/2008 | Justak | | |
| 2008/0265513 A1 | 10/2008 | Justak | | |
| 2011/0121519 A1 | 5/2011 | Justak | | |
| 2015/0354455 A1 * | 12/2015 | Suciu | ............... | F02C 3/04 |
| | | | | 60/782 |

FOREIGN PATENT DOCUMENTS

| | | |
|---|---|---|
| EP | 1269048 | 1/2006 |
| EP | 2137383 | 12/2009 |
| EP | 2279364 | 2/2011 |
| EP | 2286119 | 2/2011 |
| EP | 1654484 | 4/2011 |
| WO | 2001075339 | 10/2001 |
| WO | 2001075339 | 7/2002 |
| WO | 2005001316 | 1/2005 |
| WO | 2008094761 | 8/2008 |
| WO | 2009138787 | 12/2009 |
| WO | 2009146258 | 12/2009 |

* cited by examiner

NON-CONTACT SEAL ASSEMBLY FOR ROTATIONAL EQUIPMENT

BACKGROUND OF THE INVENTION

1. Technical Field

This disclosure relates generally to rotational equipment and, more particularly, to a non-contact seal assembly for rotational equipment.

2. Background Information

Rotational equipment typically includes one or more seal assemblies for sealing gaps between rotors and stators. A typical seal assembly includes a contact seal with a seal element such as a knife edge seal that engages a seal land. Such a contact seal, however, can generate a significant quantity of heat which can reduce efficiency of the rotational equipment as well as subject other components of the rotational equipment to high temperatures and internal stresses. To accommodate the high temperatures and stresses, other components of the rotational equipment may be constructed from specialty high temperature materials, which can significantly increase the manufacturing and servicing costs as well as the mass of the rotational equipment. While non-contact seals have been developed in an effort to reduce heat within rotational equipment, such non-contact seals can be difficult to configure within the rotational equipment. Such non-contact seals and associated components (e.g., shafts, linkages, etc.) may also need to be replaced when incidental contact occurs.

There is a need in the art for improved seal assemblies for rotational equipment.

SUMMARY OF THE DISCLOSURE

According to an aspect of the present disclosure, an assembly is provided for rotational equipment. This assembly includes a bladed rotor assembly, a stator vane assembly, a fixed stator structure and a seal assembly. The bladed rotor assembly includes a rotor disk structure. The stator vane assembly is disposed adjacent the bladed rotor assembly. The fixed stator structure is connected to and radially within the stator vane assembly. The seal assembly' is configured for sealing a gap between the stator structure and the rotor disk structure, where the seal assembly includes a non-contact seal.

According to another aspect of the present disclosure, an aircraft propulsion system is provided which includes a gas turbine engine. The gas turbine engine includes a turbine section, which includes a rotor assembly, a fixed stator structure and a seal assembly. The fixed stator structure is axially adjacent the rotor assembly. The seal assembly is configured for sealing a gap between the stator structure and the rotor assembly, where the seal assembly includes a non-contact seal.

According to still another aspect of the present disclosure, an aircraft propulsion system is provided which includes a gas turbine engine. The gas turbine engine includes a combustor and a turbine section. The turbine section includes a bladed rotor assembly, a stator vane assembly, a stator structure and a seal assembly. The bladed rotor assembly includes a rotor disk structure. The stator vane assembly is disposed axially between and adjacent the combustor and the bladed rotor assembly. The stator structure is connected to and radially within the stator vane assembly. The seal assembly is configured for sealing a gap between the stator structure and the rotor disk structure, where the seal assembly includes a non-contact seal.

The non-contact seal may be a hydrostatic non-contact seal.

The non-contact seal may include an annular base, a plurality of shoes and a plurality of spring elements. The shoes may be arranged around and radially adjacent the rotor disk structure. Each of the spring elements may be radially between and connect a respective one of the shoes to the base.

The base may be configured with a monolithic full hoop body.

A combustor may be included that is adjacent the stator vane assembly. A diffuser structure may be included that forms a diffuser plenum around the combustor.

The stator structure may be configured with the diffuser structure.

The stator structure may include a tangential onboard injection nozzle configured to direct cooling air into an aperture in the rotor disk structure.

The stator structure may be configured with an aperture to direct air into an axial gap between a platform of the stator vane assembly and the rotor disk structure.

The seal assembly may be configured with an aperture to direct air across the seal assembly and into an axial gap between a platform of the stator vane assembly and the rotor disk structure.

The bladed rotor assembly may be a turbine rotor assembly. The stator vane assembly may be upstream of the bladed rotor assembly.

The rotor disk structure may include a rotor disk and a side plate attached to the rotor disk. The side plate may include a seal land with a cylindrical outer surface. The non contact seal may form a seal with the cylindrical outer surface.

The side plate may have a full hoop monolithic annular body.

The bladed rotor assembly may include a plurality of rotor blades arranged around the rotor disk. The rotor disk structure may include a segmented second side plate circumscribing the side plate, and axially between the side plate and roots of the rotor blades.

The gas turbine engine may include a combustor. The fixed stator structure may be axially between and adjacent to the combustor and the rotor assembly.

The rotor assembly may include a rotor disk structure which includes a seal land with a cylindrical outer surface. The non-contact seal may circumscribe and form a seal with the outer surface.

The stator structure may be configured with a tangential onboard injection nozzle configured to direct air into an aperture in the rotor assembly.

The foregoing features and the operation of the invention will become more apparent in light of the following description and the accompanying drawings.

DETAILED DESCRIPTION OF THE INVENTION

Figure 1:
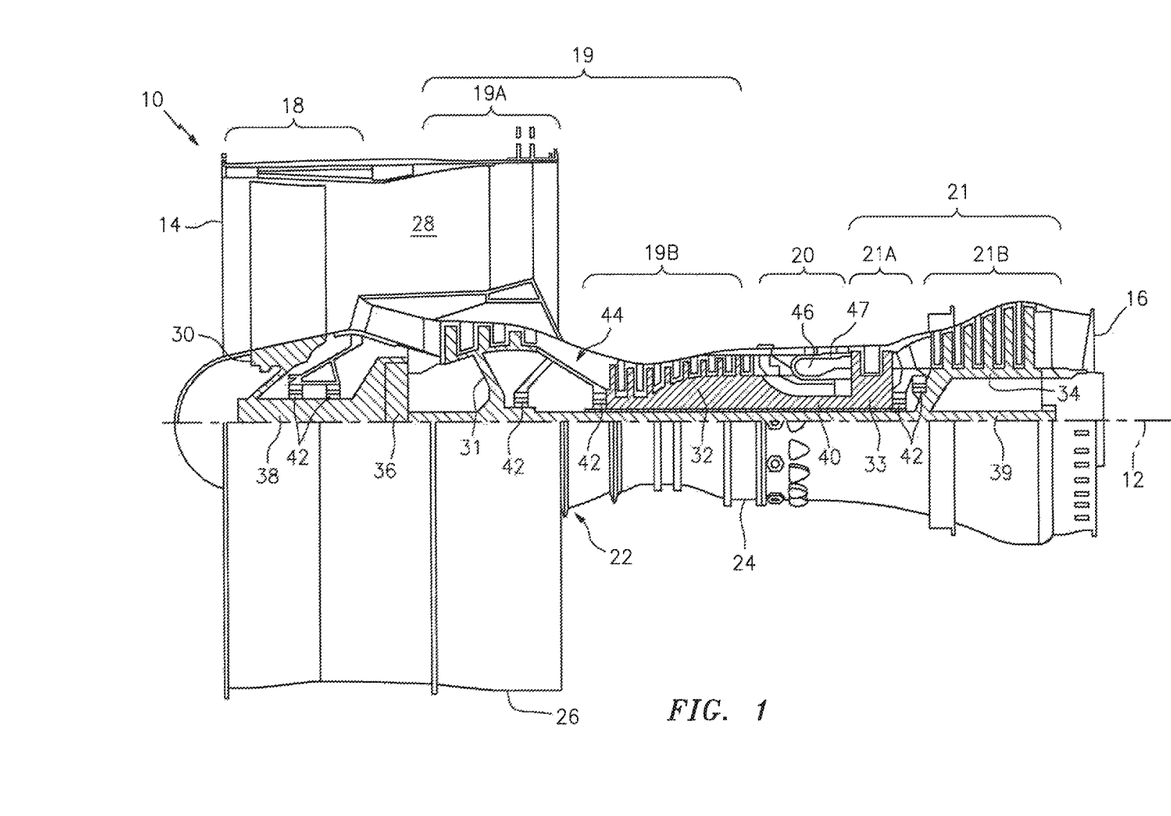
FIG. 1 is a side cutaway illustration of a gas turbine engine.

FIG. 1 is a side cutaway illustration of a gas turbine engine 10 for an aircraft propulsion system. This turbine engine 10 is configured as a geared turbofan engine, and extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (TIM section 21A and a low pressure turbine (LPT) section 21B.

The engine sections 18-21 are arranged sequentially along the centerline 12 within an engine housing 22. This housing 22 includes an inner case 24 (e.g., a core case) and an outer case 26 (e.g., a fan case). The inner case 24 may house one or more of the engine sections 19-21 (e.g., an engine core), and may be housed within an inner nacelle structure/inner fixed structure (not shown) which provides an aerodynamic cover for the inner case 24. The inner case 24 may be configured with one or more axial and/or circumferential inner sub-casings; e.g., case segments. The outer case 26 may house at least the fan section 18, and may be housed within an outer nacelle structure (not shown) which provides an aerodynamic cover for the outer case 26. Briefly, the outer nacelle structure along with the outer case 26 overlaps the inner nacelle structure thereby defining a bypass gas path 28 radially between the nacelle structures. The outer case 26 may be configured with one or more axial and/or circumferential outer case segments.

Each of the engine sections 18-19B, 21A and 21B includes a respective rotor 30-34. Each of these rotors 30-34 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s). Each of the rotors 31-34 may also include one or more rotor disk linkages, which interconnect adjacent rotor disks within the respective rotor and/or the rotor to a shaft.

The fan rotor 30 is connected to a gear train 36, for example, through a fan shaft 38. The gear train 36 and the LPC rotor 31 are connected to and driven by the LPT rotor 34 through a low speed shaft 39. The HPC rotor 32 is connected to and driven by the HPT rotor 33 through a high speed shaft 40. The shafts 38-40 are rotatably supported by a plurality of bearings 42; e.g., rolling element and/or thrust bearings. Each of these bearings 42 is connected to the engine housing 22 (e.g., the inner case 24) by at least one stationary structure such as, for example, an annular support strut.

During operation, air enters the turbine engine 10 through the airflow inlet 14. This air is directed through the fan section 18 and into a core gas path 44 and the bypass gas path 28. The core gas path 44 extends sequentially through the engine sections 19-21. The air within the core gas path 44 may be referred to as "core air". The air within the bypass gas path 28 may be referred to as "bypass air".

Figure 2:
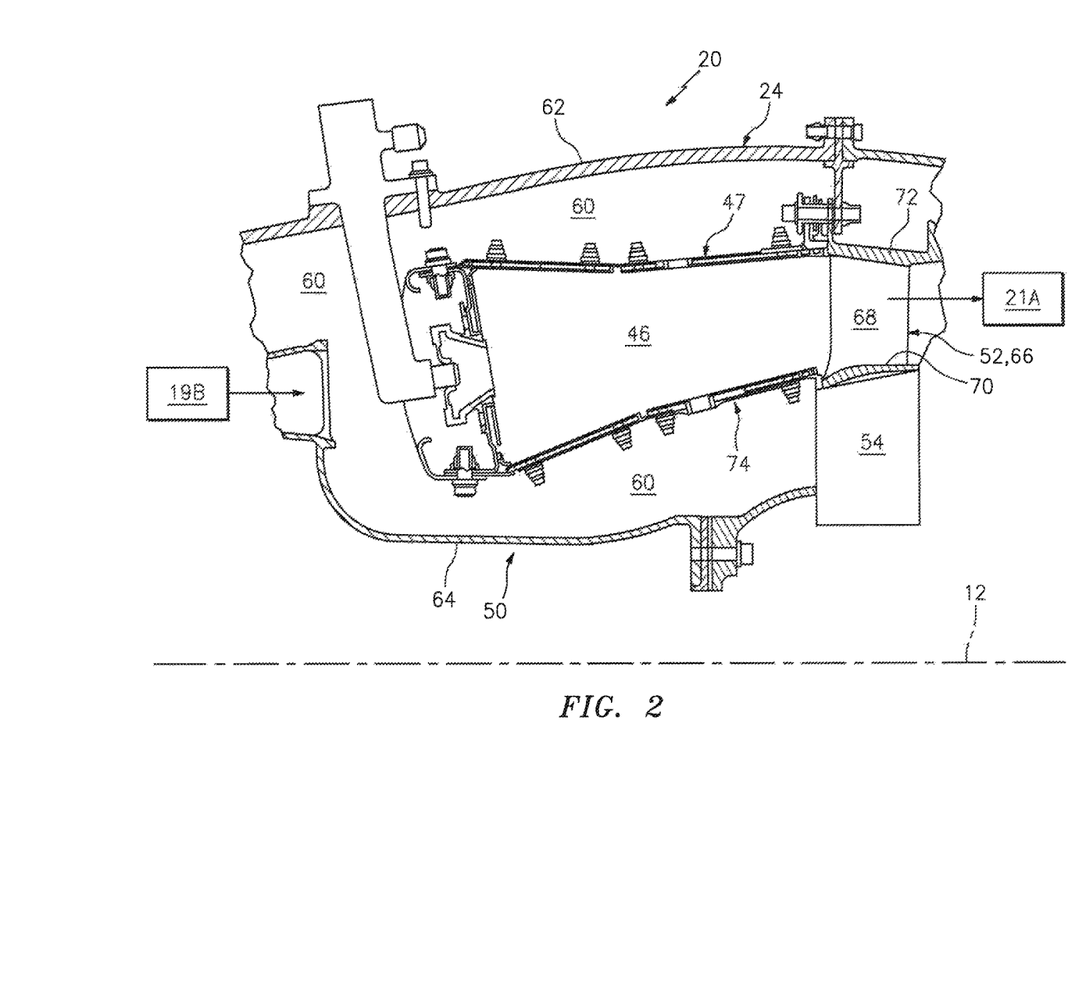
FIG. 2 is a side cutaway/block diagram illustration of a combustor section of the gas turbine engine.

The core air is compressed by the compressor rotors 31 and 32 and directed into a combustion chamber 46 of a combustor 47 in the combustor section 20 (see also FIG. 2). Fuel is injected into the combustion chamber 46 and mixed with the compressed core air to provide a fuel-air mixture. This fuel air mixture is ignited and combustion products thereof flow through and sequentially cause the turbine rotors 33 and 34 to rotate. The rotation of the turbine rotors 33 and 34 respectively drive rotation of the compressor rotors 32 and 31 and, thus, compression of the air received from a core airflow inlet. The rotation of the turbine rotor 34 also drives rotation of the fan rotor 30, which propels bypass air through and out of the bypass gas path 28. The propulsion of the bypass air may account for a majority of thrust generated by the turbine engine 10, e.g., more than seventy-five percent (75%) of engine thrust. The turbine engine 10 of the present disclosure, however, is not limited to the foregoing exemplary thrust ratio.

Figure 3:
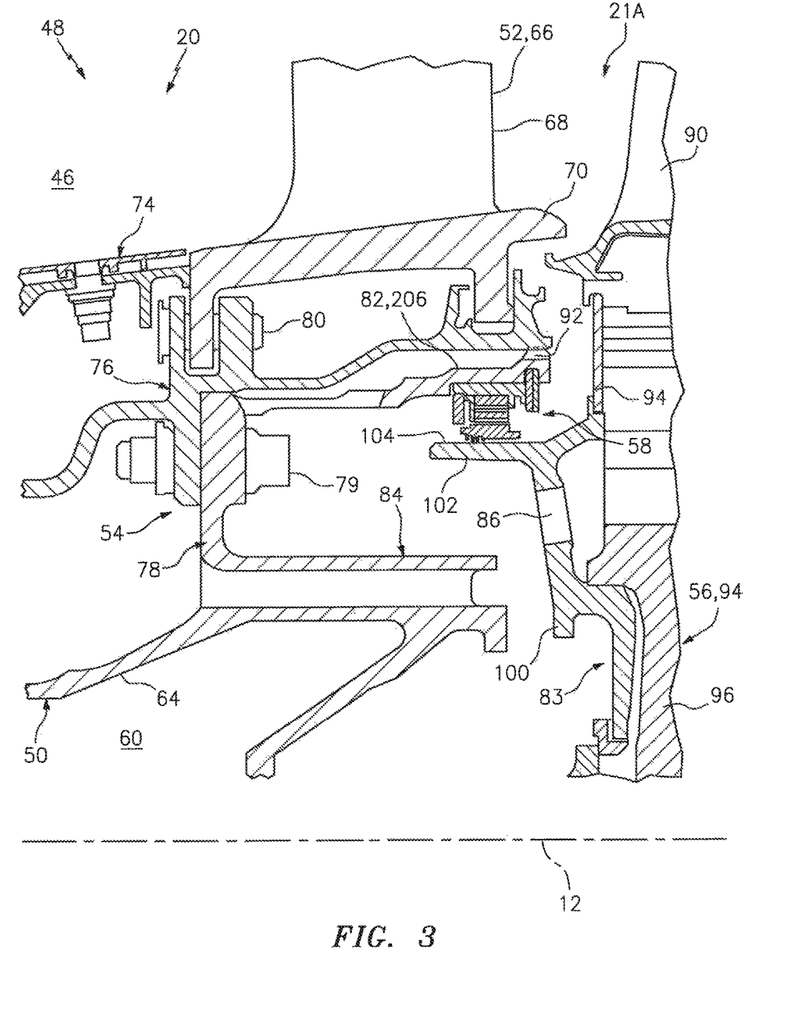
FIG. 3 is a side cutaway illustration of a portion of a high pressure turbine (UPI) section and the combustor section.

FIG. 2 illustrates an assembly 48 for the turbine engine 10. This turbine engine assembly 48 includes an assemblage of stator elements (e.g., 47, 50, 52 and 54). Referring to FIG. 3, the turbine engine assembly 48 also includes at least one rotor 56 and a seal assembly 58.

Referring again to FIG. 2, the assemblage of stator elements includes the combustor 47 and a diffuser structure 50. This diffuser structure 50 is configured to form an annular diffuser plenum 60 that surrounds the combustor 47. For example, a radially outer portion 62 of the diffuser structure 50 is spaced apart from and circumscribes the combustor 47. This outer portion 62 may be configured as a segment of or otherwise connected to the inner case 24. A radially inner portion 64 of the diffuser structure 50 is spaced apart from and is disposed radially within the combustor 47.

The assemblage of stator elements also includes a stator vane assembly 52 and a fixed stator structure 54 (shown in block form in FIG. 2). The stator vane assembly 52 includes an array of stators vanes 66 (e.g., exit guide vanes) arranged circumferentially around the centerline 12. Each of these stator vanes 66 includes a stator vane airfoil 68, which extends radially between an inner platform 70 and an outer platform 72 (see FIG. 2). The inner platform 70 is disposed adjacent and downstream of the combustor 47 and, more particularly, an inner wall structure 74 of the combustor 47. The outer platform 72 may be connected to a turbine engine case, which may be configured as or included in the inner case 24 (see FIG. 2). One or more of the stator vane airfoils 68 may be configured as a hollow stator vane airfoil.

The stator vane assembly 52 of FIG. 3 is a segmented stator vane assembly. The stator vanes 66 may be configured into singlets, doublets, etc., with corresponding segments of the inner platform 70 and the outer platform 72. To seal gaps between the segments, the stator vane assembly 52 may include one or more feather seals (not shown) for sealing between inner platform 70 segments and/or the outer platform 72 segments. The stator vane assembly 52, of course, may also or alternatively include one or more other types of seals to seal inter-segment gaps.

The stator structure 54 includes an annular mounting structure 76 and an annular base structure 78. Of course, in other embodiment, these components 76 and 78 may be configured into a single component. In addition or alternatively, the stator structure 54 may include one or more components other than those illustrated in FIG. 3.

The mounting structure 76 is disposed radially within and circumscribed by the stator vane assembly 52. The mounting structure 76 is configured to structurally tie the stator vane assembly 52 to the combustor 47. However, the stator vane assembly 52 may be arranged to radially slide relative to the mounting structure 76 to accommodate thermally induced movement therebetween. The mounting structure 76, for example, may be mechanically attached to the stator vane assembly 52 by one or more anti-rotation features 80; e.g., pins. The mounting structure 76, however, may be fixedly mounted to the combustor 47 and/or another component such that the mounting structure 76 and the stator structure 54 in general are "fixed" within the engine 10.

The mounting structure 76 may be configured with a monolithic full hoop body. Herein, the term "monolithic" may describe a component which is formed as a single unitary body. The mounting structure 76, for example, includes an integral, tubular body that is formed without any mechanically interconnected axial and/or circumferential segments. Note, in some embodiments, a monolithic body may include one or more bodies bonded together. In another example, arcuate segments (e.g., halves) may be respectively bonded together to form a full hoop body. The assembly 48 of the present disclosure, however, is not limited to the foregoing exemplary mounting structure configuration.

The base structure 78 is disposed radially within and circumscribed by the mounting structure 76. The base structure 78 is connected to the stator vane assembly 52 through the mounting structure 76. The base structure 78, for example, may be mechanically fastened to the mounting structure 76 by one or more fasteners 79.

The base structure 78 is configured to support and locate the seal assembly 58. The base structure 78 of FIG. 3, for example, includes a support portion 82 (e.g., an annular flange) disposed radially within and circumscribed by the mounting structure 76. This support portion 82 is disposed radially between the mounting structure 76 and the rotor. The support portion 82 is configured to receive and mate with the seal assembly 58.

At least a portion of the base structure 78 (e.g., the support portion 82) may be configured with a monolithic full hoop body. The base structure 78, for example, includes an integral, tubular body that is formed without any mechanically interconnected axial and/or circumferential segments. Note, in some embodiments, a monolithic body may include one or more bodies bonded together. In another example, arcuate segments (e.g., halves) may be respectively bonded together to form a full hoop body. The assembly 48 of the present disclosure, however, is not limited to the foregoing exemplary base structure 78 configuration.

The base structure 78 may be configured with the diffuser structure 50. The base structure 78 of FIG. 3, for example, is configured as an axial end portion of the diffuser structure 50. However, in other embodiments, the base structure 78 may be discrete from or attached to the diffuser structure 50.

The base structure 78 may include one or more tangential onboard injection (TOBI) nozzles 84. These TOBI nozzles 84 of FIG. 3 are arranged circumferentially around the centerline 12 and radially within the support portion 82 of the base structure 78. Each of the TOBI nozzles 84 is configured to direct cooling air, received from the plenum 60, into one or more apertures 86 a rotor disk structure 88. Briefly, this cooling air may subsequently be routed through internal passages and/or cavities in the rotor disk structure 88 and corresponding rotor blades 90 attached therewith for cooling those components. Herein, the term "tangential onboard injection (TOBI) nozzle" may described a nozzle which directs air along a trajectory which is generally tangent to a circle.

The stator structure 54 may also include one or more cooling apertures 92; e.g., slots laterally between anti-rotation teeth of the support portion 82 that engage the mounting structure 76. Each of these cooling apertures 92 may be configured to direct cooling air, received from the plenum 60, against the rotor disk structure 88. More particular, in the embodiment of FIG. 3, the cooling apertures 92 are configured to direct the cooling air against a side plate 94.

The rotor 56 may be configured as one of the rotors 30-34; e.g., the HPT rotor 33 (see FIG. 1). The rotor 56 of FIG. 3 includes a bladed rotor assembly 94; e.g., a first stage high pressure turbine (HPT) rotor assembly. The bladed rotor assembly 94 is disposed downstream of and adjacent to the stator components 52 and 54. The bladed rotor assembly 94 includes the rotor disk structure 88 and the rotor blades 90; e.g., turbine blades. These rotor blades 90 are arranged circumferentially around and attached to the rotor disk structure 88; e.g., via fir tree roots.

The rotor disk structure 88 includes a rotor disk 96 and one or more annular side plates 94 and 100 configured to enclose one or more cavities, chambers, flow paths within the bladed rotor assembly 94. The inner side plate 100 may have a monolithic full hoop body attached to the rotor disk 96. The inner side plate 100 of FIG. 3, for example, may be attached and fixed to the rotor disk 96 by an interference fit and/or one or more other techniques such as, but not limited to, mechanically fastening via one or more fasteners, bonding via welding, etc. The inner side plate 100 includes an annular seal land 102; e.g., an annular axially extending flange. This seal land 102 includes a cylindrical outer surface 104 for forming a seal with the seal assembly 58. Herein, the term "cylindrical" may describe a surface or part with a circular-annular cross-sectional geometry which extends substantially (e.g., only) axially along a centerline. In contrast, a "conical" surface or part may also extend in a radial direction towards or away from the centerline.

The outer side plate 94 may be segmented to allow for thermal distortion thereof. The outer side plate 94 circumscribes the inner side plate 100, and is attached to the rotor disk 96. An inner end of the outer side plate 94 of FIG. 3, for example, is sandwiched axially between the rotor disk 96 and the inner side plate 100. An outer end of the outer side plate 94 may be disposed in an annular channel formed by the rotor blades 90.

The seal assembly 58 is arranged in a radial gap between the stator structure 54 and the seal land 102. The seal assembly 58 is configured to substantially seal the respective gap. More particularly, the seal assembly 58 is configured to control (e.g., reduce or substantially eliminate) air leakage between the stator structure 54 and the outer surface 104. Of course, in some embodiments, the seal assembly 58 may be configured to allow a predetermined amount of leakage air to pass thereacross in order to direct air into the axial gap between the stator structure 54 and the rotor 56. The downstream seal assembly 58 includes an annular non-contact seal 208 such as, but not limited to, a hydrostatic non-contact seal. In this embodiment, the support portion 82 of the base structure 78 is configured as a carrier 206 (see FIG. 4) for the non-contact seal.

Referring to FIGS. 4 to 7, the non-contact seal 208 includes one or more circumferentially spaced shoes 226 which are located in a non-contact position along the cylindrical surface of the seal land 102. Each shoe 226 is formed with a sealing surface 228 and a slot 230 extending radially inwardly toward the sealing surface 228.

Figure 4:
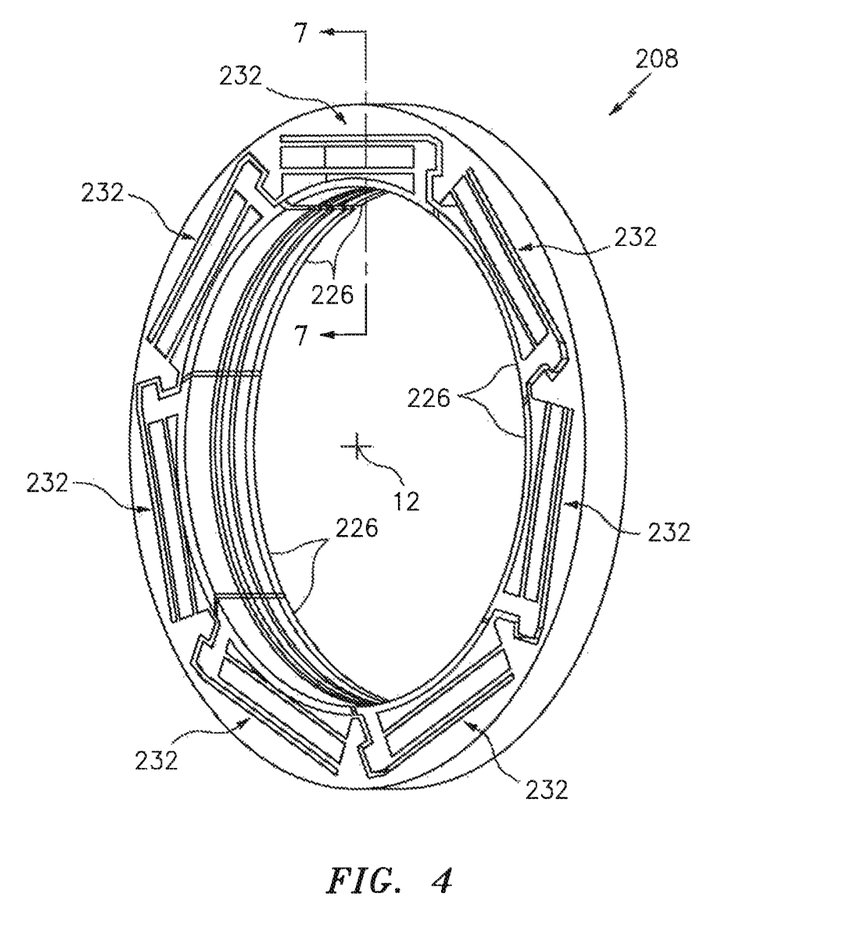
FIG. 4 is a perspective illustration of a non-contact seal.
Figure 5:
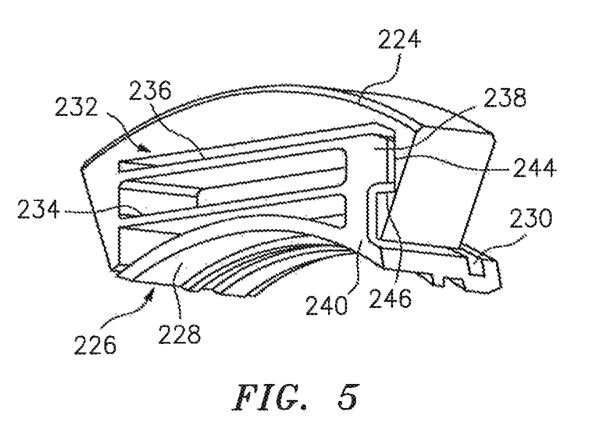
FIG. 5 is a perspective illustration of a portion of the non-contact seal of FIG. 4.
Figure 6:
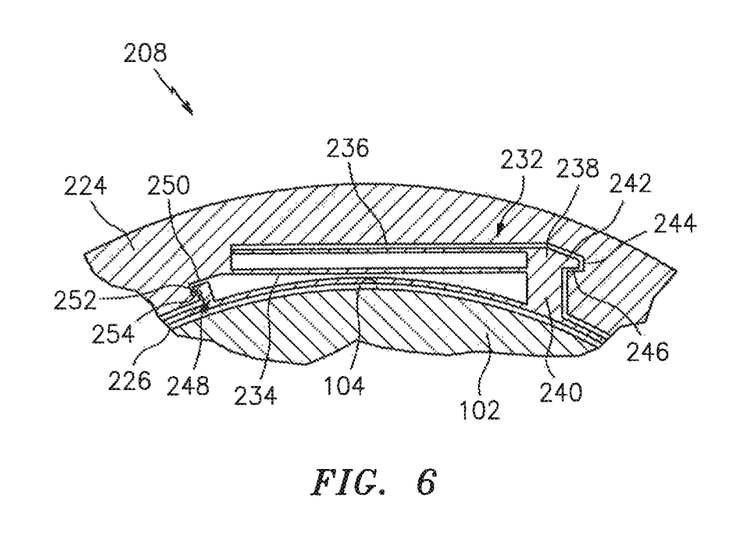
FIG. 6 is a cross-sectional illustration of a portion of the non-contact seal of FIG. 4.
Figure 7:
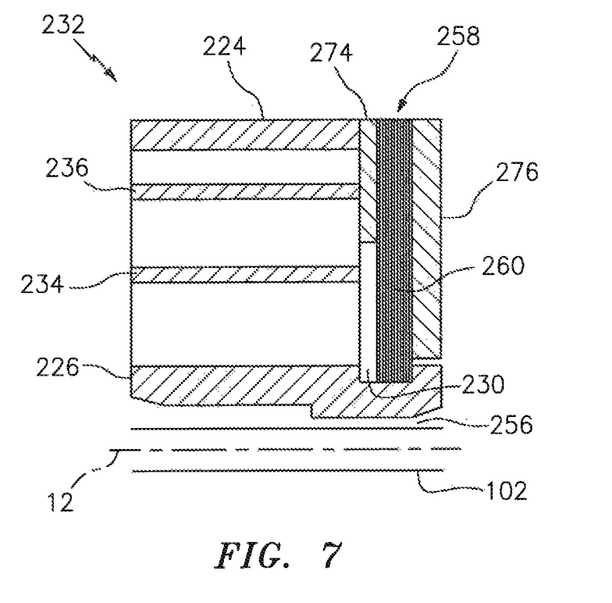
FIGS. 7 and 8 are side sectional illustrations of alternative portions of the non-contact seal of FIG. 4.

Under some operating conditions, particularly at higher pressures, it may be desirable to limit the extent of radial movement of the shoes 226 with respect to the seal land 102 to maintain tolerances; e.g., the spacing between the shoes 226 and the cylindrical surface 128. The non-contact seal 208 includes one or more circumferentially spaced spring elements 232, the details of one of which are best seen in FIGS. 6 and 7. Each spring element 232 is formed with an inner band 234 and an outer band 236 radially outwardly spaced from the inner band 234. One end of each of the bands 234 and 236 is mounted to or integrally formed with a stationary base 224 of the seal and the opposite end thereof is connected to a first stop 238. This base 224 may be configured as a monolithic full hoop body as best seen in FIG. 4. Of course, the present disclosure is not limited to the aforesaid exemplary configuration.

Figure 8:
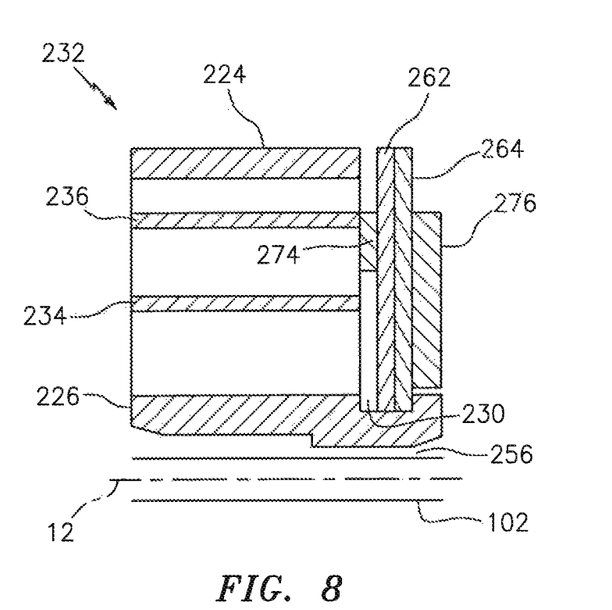

The first stop 238 includes a strip 240 which is connected to a shoe 226 (one of which is shown in FIGS. 7 and 8), and has an arm 242 opposite the shoe 226 which may be received within a recess 244 formed in the base 224. The recess 244 has a shoulder 246 positioned in alignment with the arm 242 of the first stop 238.

A second stop 248 is connected to or integrally formed with the strip 240 and is connected to the shoe 226. The second stop 248 is circumferentially spaced from the first stop 238 in a position near the point at which the inner and outer bands 234 and 236 connect to the base 224. The second stop 248 is formed with an arm 250 which may be received within a recess 252 in the base 224. The recess 252 has a shoulder 254 positioned in alignment with the arm 250 of second stop 248.

During operation, aerodynamic forces may be developed which apply a fluid pressure to the shoe 226 causing it to move radially with respect to the seal land 102. The fluid velocity increases as the gap 256 between the shoe 226 and seal land 102 increases, thus reducing pressure in the gap 256 and drawing the shoe 226 radially inwardly toward the rotor 56. As the seal gap 256 closes, the velocity decreases and the pressure increases within the seal gap 256 thus forcing the shoe 226 radially outwardly from the rotor 56. The spring elements 232 deflect and move with the shoe 226 to create a primary seal of the circumferential gap 256 between the rotor 56 and base 224 within predetermined design tolerances. The first and second stops 238 and 248 may limit the extent of radially inward and outward movement of the shoe 226 with respect to the rotor 56 for safety and operational limitation. A gap is provided between the arm 242 of first stop 238 and the shoulder 246, and between the arm 250 of second stop 248 and shoulder 254, such that the shoe 226 can move radially inwardly relative to the rotor 56. Such inward motion is limited by engagement of the arms 242, 250 with shoulders 246 and 254, respectively, to prevent the shoe 226 from contacting the rotor 56 or exceeding design tolerances for the gap between the two. The arms 242 and 250 also contact the base 224 in the event the shoe 226 moves radially outwardly relative to the rotor 56, to limit movement of the shoe 226 in that direction.

Figure 9:
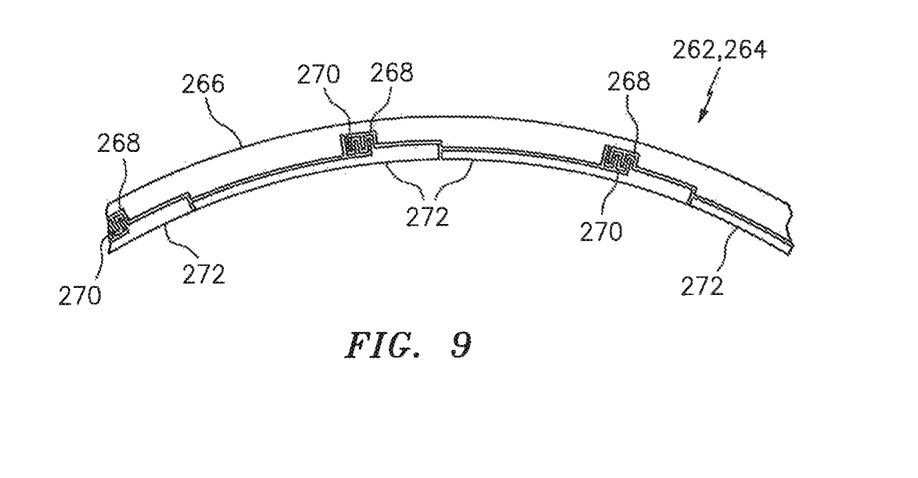
FIG. 9 is an end view illustration of a portion of a plate.

The non-contact seal 208 is also provided with a secondary seal which may take the form of a brush seal 258, as shown in FIG. 7, or a stack of at least two sealing elements oriented side-by-side and formed of thin sheets of metal or other suitable material as shown in FIGS. 8 and 9. The brush seal 258 is positioned so that one end of its bristles 260 extends into the slot 230 formed in the shoe 226. The bristles 260 deflect with the radial inward and outward movement of the shoe 226, in response to the application of fluid pressure as noted above, in such a way as to create a secondary seal of the gap 256 between the rotor 56 and base 224.

Figure 10:
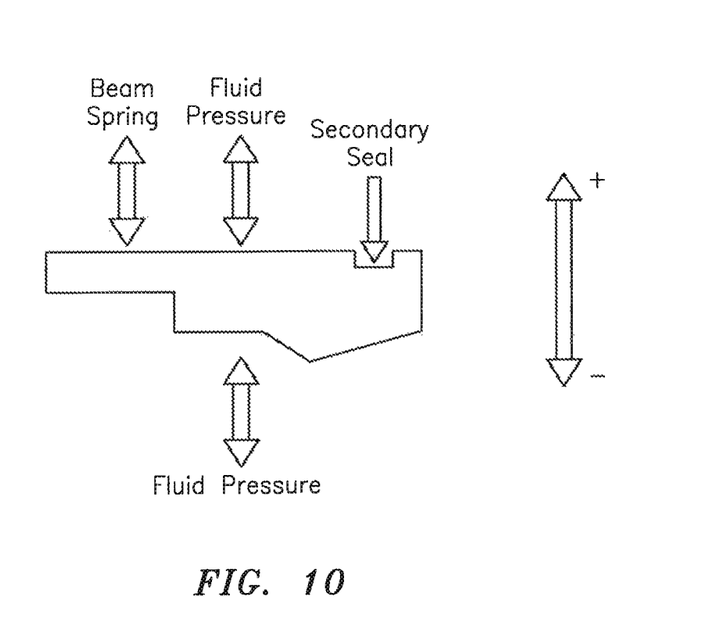
FIG. 10 is a force balance diagram of a shoe depicting aerodynamic forces, spring forces and secondary' seal forces acting on a shoe.

As shown in FIGS. 8 and 9, the secondary seal of this embodiment may include a stack of at least two sealing elements 262 and 264. Each of the sealing elements 262 and 264 includes an outer ring 266 formed with a plurality of circumferentially spaced openings 268, a spring member 270 mounted within each opening 268 and a plurality of inner ring segments 272 each connected to at least one of the spring members 270. The spring member 270 is depicted in FIG. 10 as a series of connected loops, but it should be understood that spring member 270 could take essentially any other form, including parallel bands as in the spring elements 232. The sealing elements 262 and 264 are oriented side-by-side and positioned so that the inner ring segments 272 extend into the slot 230 formed in the shoe 226. The spring members 270 deflect with the radial inward and outward movement of the shoe 226, in response to the application of fluid pressure as noted above, in such a way as to create a secondary seal of the gap 256 between the rotor 56 and base 224. As such, the sealing elements 272 and 264 assist the spring elements 232 in maintaining the shoe 226 within design clearances relative to the rotor 56.

One or more of the spring elements 262 and 264 may be formed of sheet metal or other suitable flexible, heat-resistant material. The sealing elements 262 and 264 may be attached to one another, such as by welding and/or any other bonding technique, a mechanical connection or the like, or they may positioned side-by-side within the slot 230 with no connection between them. In order to prevent fluid from passing through the openings 268 in the outer ring 266 of each sealing element 262 and 264, adjacent sealing elements are arranged so that the outer ring 266 of one sealing element 262 covers the openings 268 in the adjacent sealing element 264. Although not required, a front plate 274 may be positioned between the spring element 232 and the sealing element 262, and a back plate 276 may be located adjacent to the sealing element 264 for the purpose of assisting in supporting the sealing elements 262, 264 in position within the shoe 226.

During operation, the non-contact seal 208 is subjected to aerodynamic forces as a result of the passage of air along the surface of the shoes 226 and the seal land 102. The operation of non-contact seal 208 is dependent, in part, on the effect of these aerodynamic forces tending to lift the shoes 226 radially outwardly relative to the surface of rotor 56, and the counteracting forces imposed by the spring elements 232 and the secondary seals (e.g., brush seal 258 or the stacked seal formed by plates 262, 264) which tend to urge the shoes 226 in a direction toward the rotor 56. These forces acting on the shoe 226 are schematically depicted with arrows in FIG. 10. These forces acting on the non-contact seal 208 may be balanced to ensure that nominal clearance is maintained.

The present disclosure is not limited to the exemplary non-contact seal 208 described above. Various other non-contact seals are known in the art and may be reconfigured in light of the disclosure above to be included with the assembly 48 of the present disclosure. Other examples of non-contact seals are disclosed in U.S. Pat. No. 8,172,232; U.S. Pat. No. 8,002,285; U.S. Pat. No. 7,896,352; U.S. Pat. No. 7,410,173; U.S. Pat. No. 7,182,345; and U.S. Pat. No. 6,428,009, each of which is hereby incorporated herein by reference in its entirety. Still another example of a non-contact seal is a hydrodynamic non-contact seal.

The assembly 48 may be included in various aircraft and industrial turbine engines other than the one described above as well as in other types of rotational equipment; e.g., wind turbines, water turbines, rotary engines, etc. The assembly 48, for example, may be included in a geared turbine engine where a gear train connects one or more shafts to one or more rotors in a fan section, a compressor section and/or any other engine section. Alternatively, the assembly 48 may be included in a turbine engine configured without a gear train. The assembly 48 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for rotational equipment, the assembly comprising:
   a bladed rotor assembly including a rotor disk structure;
   a stator vane assembly disposed adjacent the bladed rotor assembly;
   a fixed stator structure connected to and radially within the stator vane assembly; and
   a seal assembly configured for sealing a gap between the fixed stator structure and the rotor disk structure, wherein the seal assembly includes a non-contact seal;
   wherein the non-contact seal comprises:
      an annular base, wherein the annular base is configured with a monolithic full hoop body;
      a plurality of shoes arranged around and radially adjacent the rotor disk structure; and
      a plurality of spring elements, each of the spring elements radially between and connecting a respective one of the shoes to the annular base.

2. The assembly of claim 1, wherein the non-contact seal is a hydrostatic non-contact seal.

3. The assembly of claim 1, further comprising:
   a combustor adjacent the stator vane assembly; and
   a diffuser structure forming a diffuser plenum around the combustor.

4. The assembly of claim 3, wherein the fixed stator structure is configured with the diffuser structure.

5. The assembly of claim 1, wherein the fixed stator structure includes a tangential onboard injection nozzle configured to direct cooling air into an aperture in the rotor disk structure.

6. The assembly of claim 1, wherein the fixed stator structure is configured with an aperture to direct air into an axial gap between a platform of the stator vane assembly and the rotor disk structure.

7. The assembly of claim 1, wherein the seal assembly is configured with an aperture to direct air across the seal assembly and into an axial gap between a platform of the stator vane assembly and the rotor disk structure.

8. The assembly of claim 1, wherein
   the bladed rotor assembly is a turbine rotor assembly; and
   the stator vane assembly is upstream of the bladed rotor assembly.

9. The assembly of claim 1, wherein
   the rotor disk structure includes a rotor disk and a side plate attached to the rotor disk;
   the side plate includes a seal land with a cylindrical outer surface; and
   the non-contact seal forms a seal with the cylindrical outer surface.

10. The assembly of claim 9, wherein the side plate has a full hoop monolithic annular body.

11. The assembly of claim 9, wherein
    the bladed rotor assembly further includes a plurality of rotor blades arranged around the rotor disk; and
    the rotor disk structure further includes a segmented second side plate circumscribing the side plate, and axially between the side plate and roots of the rotor blades.

12. An aircraft propulsion system, comprising:
    a gas turbine engine including a turbine section which comprises:
       a rotor assembly;
       a fixed stator structure axially adjacent the rotor assembly; and
       a seal assembly configured for sealing a gap between the stator structure and the rotor assembly, wherein the seal assembly includes a non-contact seal
    wherein the non-contact seal comprises:
       an annular base configured with a monolithic full hoop body;
       a plurality of shoes arranged around and radially adjacent the rotor assembly; and
       a plurality of spring elements, each of the spring elements radially between and connecting a respective one of the shoes to the annular base.

13. The system of claim 12, wherein the non-contact seal is a hydrostatic non-contact seal.

14. The system of claim 12, wherein
    the gas turbine engine further includes a combustor; and
    the fixed stator structure is axially between and adjacent to the combustor and the rotor assembly.

15. The system of claim 12, wherein
    the rotor assembly includes a rotor disk structure comprising a seal land with a cylindrical outer surface; and
    the non-contact seal circumscribes and forms a seal with the cylindrical outer surface.

16. The system of claim 12, wherein the stator structure is configured with a tangential onboard injection nozzle configured to direct air into an aperture in the rotor assembly.

17. An aircraft propulsion system, comprising:
    a gas turbine engine including a combustor and a turbine section which comprises:
       a bladed rotor assembly including a rotor disk structure;
       a stator vane assembly disposed axially between and adjacent the combustor and the bladed rotor assembly;
       a stator structure connected to and radially within the stator vane assembly; and a seal assembly configured for sealing a gap between the stator structure and the rotor disk structure, wherein the seal assembly includes a non-contact seal;

wherein the non-contact seal comprises:

an annular base configured with a monolithic full hoop body;

a plurality of shoes arranged around and radially adjacent the rotor disk structure; and a plurality of spring elements, each of the spring elements radially between and connecting a respective one of the shoes to the annular base.

18. The system of claim 17, wherein the non-contact seal is a hydrostatic non-contact seal.

* * * * *